(12) United States Patent
Secher et al.

(10) Patent No.: US 10,281,065 B2
(45) Date of Patent: May 7, 2019

(54) FLEXIBLE PIPE FOR TRANSPORTING FLUID AND ASSOCIATED METHOD

(71) Applicant: Technip France, Courbevoie (FR)

(72) Inventors: Philippe Secher, Deville les Rouen (FR); Patrice Jung, Saint Laurent les Tours (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/118,413

(22) PCT Filed: Feb. 11, 2015

(86) PCT No.: PCT/EP2015/052896
§ 371 (c)(1),
(2) Date: Aug. 11, 2016

(87) PCT Pub. No.: WO2015/121316
PCT Pub. Date: Aug. 20, 2015

(65) Prior Publication Data
US 2017/0175933 A1 Jun. 22, 2017

(30) Foreign Application Priority Data
Feb. 11, 2014 (FR) .................................... 14 51051

(51) Int. Cl.
*F16L 11/08* (2006.01)
*F16L 55/04* (2006.01)

(52) U.S. Cl.
CPC .......... *F16L 11/083* (2013.01); *F16L 55/041* (2013.01)

(58) Field of Classification Search
CPC ................................................... F16L 11/083
(Continued)

(56) References Cited

U.S. PATENT DOCUMENTS

| 1,055,263 A | * | 3/1913 | Fischer | .................. | F16L 11/16 138/131 |
| 3,311,133 A | * | 3/1967 | Kinander | ................ | F16L 11/16 138/122 |

(Continued)

FOREIGN PATENT DOCUMENTS

| FR | 2 856 131 A1 | 12/2004 |
| WO | WO 92/02751 A1 | 2/1992 |

(Continued)

OTHER PUBLICATIONS

International Search Report dated Apr. 15, 2015 issued in corresponding International patent application No. PCT/EP2015/052896.
(Continued)

*Primary Examiner* — Craig M Schneider
*Assistant Examiner* — David R Deal
(74) *Attorney, Agent, or Firm* — Ostrolenk Faber LLP

(57) ABSTRACT

This flexible fluid transport pipe includes an inner polymer sheath defining a fluid circulation passage with a central axis; at least one armor layer positioned outside the inner sheath; an inner carcass, positioned in the inner sheath, the inner carcass comprising a first bent tape defining a helical interstice emerging toward the central axis. The pipe includes a helical insert with a T-shaped cross-section comprising a rod inserted in the helical interstice and two wings protruding on either side of the rod to inwardly close off the helical interstice. The helical insert is formed from a second bent tape.

23 Claims, 6 Drawing Sheets

(58) Field of Classification Search
USPC .......................................... 138/134, 135, 136
See application file for complete search history.

(56) References Cited

U.S. PATENT DOCUMENTS

| | | | | |
|---|---|---|---|---|
| 4,224,965 A * | 9/1980 | Suchor | ................... | F16L 11/16 138/122 |
| 5,601,893 A * | 2/1997 | Strassel | ................... | F16L 9/147 138/118 |
| 5,934,335 A * | 8/1999 | Hardy | ................... | F16L 11/083 138/129 |
| 6,065,501 A * | 5/2000 | Feret | ................... | F16L 11/082 138/133 |
| 6,145,546 A * | 11/2000 | Hardy | ................... | F16L 11/083 138/129 |
| 6,354,333 B1 * | 3/2002 | Dupoiron | ............. | F16L 11/081 138/129 |
| 6,408,891 B1 * | 6/2002 | Jung | ................... | E21B 17/01 138/127 |
| 6,454,897 B1 * | 9/2002 | Morand | ............. | B29C 47/0023 156/244.13 |
| 6,840,286 B2 * | 1/2005 | Espinasse | ............. | F16L 11/083 138/135 |
| 6,904,939 B2 * | 6/2005 | Jung | ................... | F16L 11/083 138/131 |
| 7,000,645 B2 * | 2/2006 | GlejbOl | ............. | F16L 11/082 138/129 |
| 8,646,490 B2 * | 2/2014 | Frohne | ............. | F16L 11/118 138/121 |
| 2003/0070719 A1 * | 4/2003 | Espinasse | ............. | F16L 11/08 138/109 |
| 2004/0154677 A1 * | 8/2004 | Coutarel | ............. | F16L 11/083 138/135 |
| 2011/0226374 A1 * | 9/2011 | Kalman | ............. | F16L 11/083 138/129 |

FOREIGN PATENT DOCUMENTS

| | | |
|---|---|---|
| WO | WO 01/81810 A1 | 11/2001 |
| WO | WO 2004/005785 A1 | 1/2004 |
| WO | WO 2014/000816 A1 | 1/2014 |

OTHER PUBLICATIONS

French Search Report dated Sep. 29, 2014 issued in corresponding French patent application No. FR 1451051.

* cited by examiner

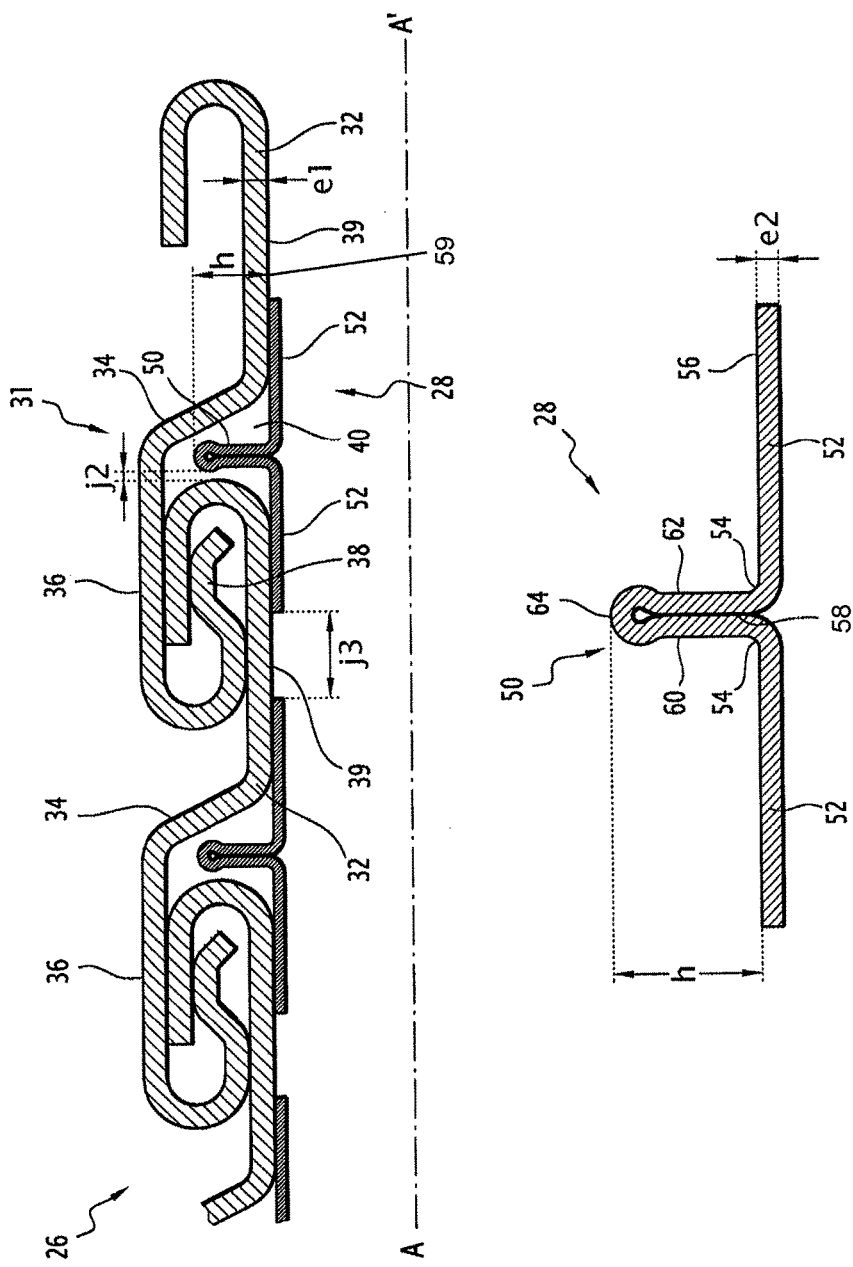

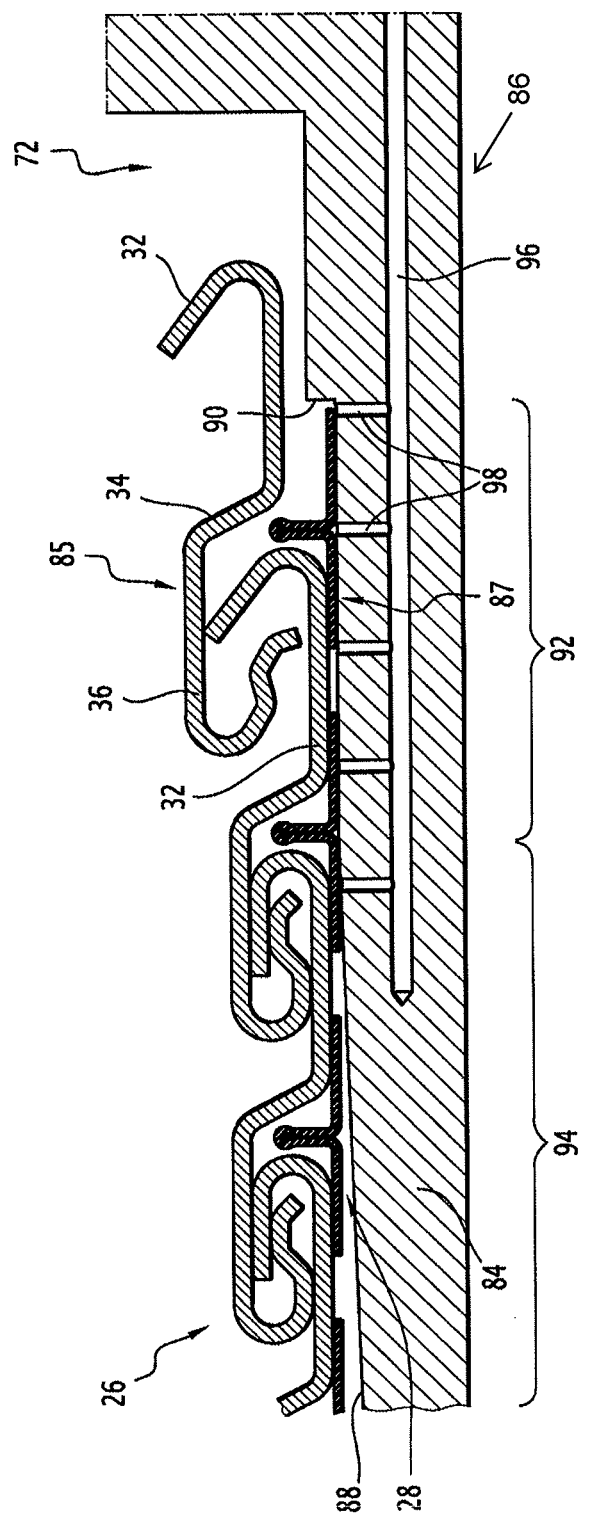

FLEXIBLE PIPE FOR TRANSPORTING FLUID AND ASSOCIATED METHOD

CROSS REFERENCE TO RELATED APPLICATIONS

The present application is a 35 U.S.C. § 371 National Phase conversion of PCT/EP2015/052896, filed Feb. 11, 2015, which claims benefit of French Application No. 1451051, filed Feb. 11, 2014, the disclosure of which is incorporated herein by reference. The PCT International Application was published in the French language.

TECHNICAL FIELD OF THE INVENTION

The present invention relates to a flexible pipe for conveying a fluid, comprising:
- an inner polymer sheath defining a fluid circulation path with a central axis;
- at least one layer of armors, arranged outside the inner sheath;
- an inner carcass, positioned in the inner sheath, the inner carcass comprising a first bent tape defining a helical interstice emerging toward the central axis;
- a helical insert with a T-shaped cross-section comprising a rod inserted in the helical interstice and two wings protruding on either side of the rod to inwardly close off the helical interstice.

The pipe is preferably a flexible pipe of the unbonded type designed to transfer hydrocarbons through an body of water, such as an ocean, sea, lake or river.

BACKGROUND OF THE INVENTION

Such a flexible pipe is for example made according to normative documents API 17J (Specification for Unbonded Flexible Pipe) and API RP 17B (Recommended Practice for Flexible Pipe) established by the American Petroleum Institute.

The pipe is generally formed by a set of concentric and superimposed layers. It is considered "unbonded" within the meaning of the present invention when at least one of the layers of the pipe is able to move longitudinally relative to the adjacent layers when the pipe is bent. In particular, an unbonded pipe is a pipe with no bonding materials connecting the layers forming the pipe.

The pipe is generally positioned through an body of water, between a bottom assembly, designed to collect the fluid produced in the bottom of the body of water, and a floating or stationary surface assembly designed to connect and distribute the fluid. The surface assembly may be a semi-submersible platform, an FPSO or another floating assembly.

In some cases, the flexible pipe comprises an inner carcass positioned in the pressure sheath, in order to avoid crushing of the pressure sheath under the effect of the external pressure, for example during depressurization of the inner fluid circulation passage defined by the pressure sheath.

The inner carcass is generally formed by a profiled metal tape, wound in a spiral. The turns of the tape are interlocked to one another. The turns define a helical interstice between them emerging radially inwardly in the central circulation passage of the fluid.

The inner surface of the carcass therefore axially has a series of hollows and bumps. The pipe is then designated by the term "rough bore".

In some cases, the circulation of the fluid along the carcass is disrupted by the reliefs defined on the carcass by the helical interstice.

This disruption of the flow is sometimes considered to be the source of vibration phenomena within the flexible pipe, or even, when a resonance is reached, of flow-induced pulsations (or "singing").

To offset this problem, it is known to manufacture flexible pipes with no inner carcass and therefore having a smooth surface ("smooth bore").

Another solution to this problem is described in WO 2014/000816. In this document, the flexible pipe comprises a carcass in which a helical insert with a T-shaped cross-section is jammed in the interstice present between the different turns of the carcass. The insert inwardly plugs the interstice.

The T-shaped profile is manufactured from two planar tapes, for example by welding between the tapes.

The manufacture of such an insert, and its arrangement in the carcass, is therefore very difficult to implement industrially.

In particular, the assembly by welding of two tapes requires implementing major equipment on the line, such as unwinders, an assembler, a laser welding station, etc.

Alternatively, the T-shaped profile could be manufactured upstream from the production of the carcass and can be stored on a drum. However, storing the T-shaped profile on a drum causes certain problems.

First of all, the shape of the profile makes it difficult to store and unwind, in particular due to the risk of "drag marks".

Furthermore, it is necessary to have a large inventory of drums, which increases costs, complicates handling, and requires a large storage area.

It is also necessary to provide a specific welder during reloading and leveling of the profile.

SUMMARY OF THE INVENTION

One aim of the invention is therefore to provide a pipe in which the risk of vibrations, or even pulsations, is limited, and that is nevertheless simple and cost-effective to manufacture on an industrial scale.

To that end, the invention relates to a pipe of the aforementioned type, characterized in that the helical insert is formed of a second bent tape.

The pipe according to the invention may include one or more of the following features, considered alone or according to any technically possible combination(s):
- the rod includes a first flank and a second flank bent against the first flank;
- the rod includes a curved outer segment at the outer free end of the rod, the curved outer segment connecting the first flank to the second flank;
- the bending radius of the curved outer segment is greater than 0.5 times the thickness of the second tape, and is in particular comprised between 0.5 times and 1 time the thickness of the second tape;
- each wing protrudes from an inner end of the first flank and the second flank, respectively, the helical insert including a first curved connecting segment connecting the first flank to a wing and a second curved connecting segment connecting the second flank to a wing, each connecting segment having a bending radius advantageously greater than 0.5 times the thickness of the second tape;

the rod has a radial expanse greater than three times the thickness of the first tape;

the inner carcass has a first axial play, the helical insert having non-joined turns delimiting an axial play between them greater than the first axial play;

the inner carcass has a first axial play, the rod having a half-axial play at the average pitch in the helical interstice greater than 0.25 times the first axial play;

the insert defines at least one fluid passage pipe connecting the interstice to the circulation passage.

The invention also relates to a method for producing a flexible pipe, comprising the following steps:

forming an inner carcass, the inner carcass comprising a first bent tape defining a helical interstice emerging toward the central axis;

producing an inner polymer sheath defining a fluid circulation path with a central axis, the inner carcass being positioned in the inner sheath;

arranging at least one layer of the outer armors outside the inner sheath;

the method including placing a helical insert with a T-shaped cross-section comprising a rod inserted in the helical interstice and two wings protruding on either side of the rod to inwardly close off the helical interstice.

characterized in that the helical insert is formed by bending a second tape.

The method according to the invention may comprise one or more of the following features, considered alone or according to any technically possible combination(s):

it includes the passage of the second tape in an insert profiler to form an insert profile with a T-shaped cross-section and the winding of the insert profile around a mandrel, the method including the passage of the first tape in a carcass profiler to form a carcass profile and the winding of the carcass profile around the insert profile on the mandrel;

the insert profiler and the carcass profiler are positioned on either side of the mandrel, the insert profile being brought onto the mandrel opposite the carcass profile;

it includes a step for closing the carcass profile after its winding around the insert profile;

the passage of the second tape in the insert profiler includes bending the second tape along the central axis to form the rod and bending the tape along two intermediate axes parallel to the central axis to form the wings;

the insert profile is pushed on the mandrel after its passage in the insert profiler.

BRIEF DESCRIPTION OF THE DRAWINGS

The invention will be better understood upon reading the following description, provided solely as an example and done in reference to the appended drawings, in which:

FIG. 2 is a partial view, in section along a median axial plane, of a detail of the pipe of FIG. 1, illustrating the carcass and the insert positioned in the interstice of the carcass;

FIG. 3 is a view of a detail of FIG. 2, illustrating the profile of the insert;

FIG. 5 is a diagrammatic view, in partial section, along the axial plane V of FIG. 4;

DESCRIPTION OF PREFERRED EMBODIMENTS

In the rest of this document, the terms "outer" and "inner" are generally to be understood radially relative to an axis A-A' of the pipe, the term "outer" being understood as being relatively radially further from the axis A-A' and the term "inner" being understood as being relatively radially closer to the axis A-A' of the pipe.

Figure 1:
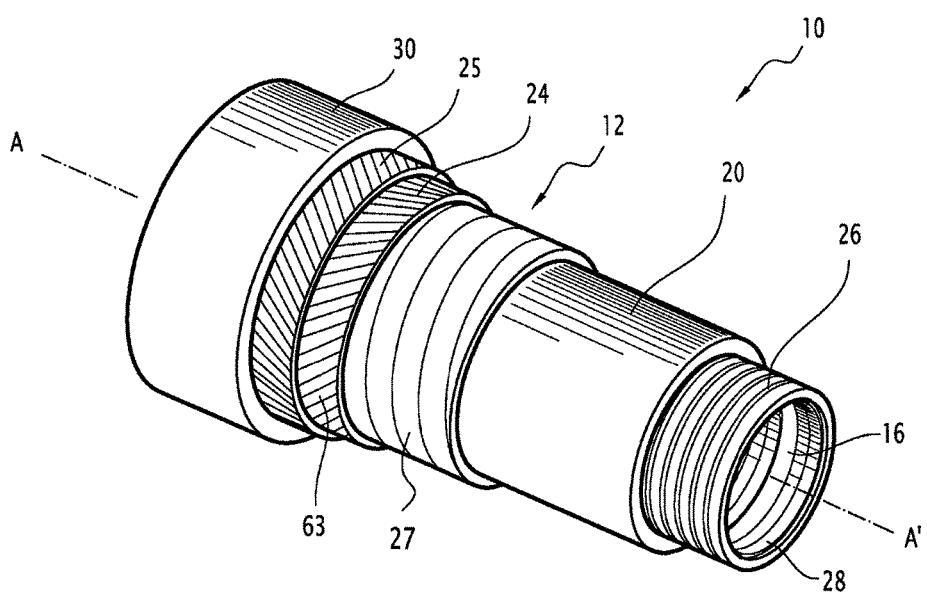
FIG. 1 is a partial cutaway perspective view of a central segment of a first flexible pipe according to the invention.

A first flexible pipe 10 according to the invention is partially illustrated in FIG. 1.

The flexible pipe 10 includes a central segment 12. It includes, at each of the axial ends of the central segment 12, an end end-piece (not shown).

In reference to FIG. 1, the pipe 10 delimits a central passage 16 for the flow of a fluid, advantageously an oil fluid. The central passage 16 extends along an axis A-A', between the upstream end and the downstream end of the pipe 10.

The flexible pipe 10 is designed to be positioned through an body of water (not shown) in a fluid exploitation facility, in particular for hydrocarbons.

The body of water is for example a sea, lake or ocean. The depth of the body of water at the fluid exploitation installation is for example comprised between 500 m and 3000 m.

The fluid exploitation installation includes a surface assembly, in particular floating, and a bottom assembly (not shown), that are generally connected to one another by the flexible pipe 10.

The flexible pipe 10 is preferably an "unbonded" pipe.

At least two adjacent layers of the flexible pipe 10 are free to move longitudinally relative to one another when the pipe bends.

Advantageously, all of the layers of the flexible pipe are free to move relative to one another. Such a pipe is for example described in the normative documents published by the American Petroleum Institute (API), API 17J and API RP 17B.

As illustrated by FIG. 1, the pipe 10 delimits a plurality of concentric layers around the axis A-A', which extend continuously along the central segment 12 up to the end-pieces 14 situated at the ends of the pipe.

According to the invention, the pipe 10 includes at least one first tubular sheath 20 with a base of a polymer material advantageously forming a pressure sheath.

The pipe 10 further includes at least one tensile armor layer 24, 25 positioned outwardly relative to the first sheath 20 forming a pressure sheath.

The pipe 10 further includes an inner carcass 26 positioned inside the pressure sheath 20, possibly a pressure vault 27 inserted between the pressure sheath 20 and the tensile armor layer(s) 24, 25, and an outer sheath 30, designed to protect the pipe 10.

According to the invention, the pipe 10 further includes an insert 28 having a T-shaped cross-section, the insert 28 being positioned inwardly bearing on the inner carcass 26.

In a known manner, the pressure sheath 20 is designed to tightly confine the fluid transported in the passage 16. It is made from a polymer material, for example with a base of a polyolefin such as polyethylene, a base of a polyamide such as PA11 or PA12, or a base of a fluorinated polymer such as polyvinylidene fluoride (PVDF).

The thickness of the pressure sheath 20 is for example comprised between 5 mm and 20 mm.

As illustrated by FIG. 2, the carcass 26 here is formed by a first profiled metal tape 31, wound in a spiral. The successive turns of the tape 31 are interlocked to one another.

The primary function of the carcass 26 is to react the radial crushing forces.

The carcass 26 is positioned inside the pressure sheath 20. It is able to come into contact with the fluid circulating in the pressure sheath 20.

The helical winding of the first profiled tape 31 forming the carcass 26 has a short pitch, i.e., it has a spiral angle with an absolute value close to 90°, typically comprised between 75° and 90°.

The first tape 31 has two edges bent longitudinally over a central region. It defines a plurality of turns with a flattened S-shaped cross-section, as illustrated by FIG. 2. The first tape 31 has a substantially constant thickness e1.

The S-shaped cross-section of each turn of the carcass 26 successively comprises, parallel to the axis A-A' from right to left in FIG. 2, a generally U-shaped inner part 32, an inclined intermediate part 34 and a generally U-shaped outer part 36 having, near its free end, a support wave 38, commonly called "pilot point".

The inner part 32 of each turn of the first tape 31 is bent toward the intermediate part 34 away from the central axis A-A', outwardly relative to the inclined part 34. It defines a U-shaped section extending parallel to the axis A-A' and opening across from the inclined part 34.

The outer part 36 of the adjacent turn is partially engaged in the inner part 32, the support wave 38 being inserted between the branches of the U.

The inner part 32 defines an inner surface 39 situated on a cylindrical enclosure with axis A-A'.

The outer part 36 also defines a U-shaped section extending parallel to the axis A-A' and opening across from the inclined part 34.

The outer part 36 of each turn is bent toward the intermediate part 34, toward the central axis A-A', inwardly relative to the inclined part 34. The outer part 36 and the support wave 38 of the section are received in the inner part 32 of an adjacent section, and partially outwardly cover the inner part 32 of the adjacent section.

For each turn, the intermediate part 34, the outer part 36 and the inner part 32 of an adjacent section define an inner interstice 40, partially or totally defining the axial play of the carcass 26.

The interstice 40 emerges radially toward the central axis A-A'. For each turn, it opens inwardly toward the axis A-A' between the inner surfaces 39 of the inner parts 32 of two adjacent turns.

It is outwardly closed off by the outer part 36 and latterly by the intermediate part 34 of a turn and by the inner part 32 of the adjacent turn.

The interstice 40 thus extends continuously in the form of a spiral with axis A-A' following a pitch P1 along the carcass 26.

Each turn of the carcass 26 has a width advantageously comprised between 25 mm and 100 mm. This width accounts for the thickness of the rod 50 of the insert 28 inserted into the interstice 40.

The carcass 26 has, between each pair of interlocked turns, a first axial play defined by the relative axial sliding travel of the outer part 36 of a turn in the inner part 32 of an adjacent turn in which it is engaged.

According to the invention, the insert 28 is positioned partially in the interstice 40 and closes off the interstice 40 toward the axis A-A'.

The insert 28 thus advantageously has a helical shape with axis A-A', pitch P1 similar to the pitch of the interstice 40.

As illustrated by FIG. 3, the insert 28 has a section, considered in a median axial plane, that is generally T-shaped.

It includes a rod 50 at least partially inserted in the interstice 40, wings 52 protruding transversely from an inner end 58 of the rod 50, and curved connecting segments 54 between the rod 50 and the wings 52.

According to the invention, the insert 28 is made in a single piece by bending a second tape 56.

The second tape 56 is preferably made from metal. It advantageously has a constant thickness e2. The thickness e2 of the second tape 56 is preferably smaller than the thickness e1 of the first tape 31. The thickness e2 of the second tape 56 is advantageously comprised between one third and two thirds of the thickness e1 of the first tape 31.

The tape e2 is for example comprised between 0.5 mm and 2 mm, in particular between 0.8 mm and 1.5 mm.

Such a thickness guarantees a sufficient stiffness, while limiting the risk of disorganization during introduction of a probe in the central passage ("pigging").

In the example illustrated in FIG. 3, the rod 50 is formed by producing a double bend in the central region of the tape 56.

The rod 50 protrudes perpendicularly relative to the wings 52.

The rod 50 thus comprises a first flank 60, and a second flank 62, advantageously applied on the first flank 60. The rod 50 further comprises, at its outer free end, a curved outer segment 64 connecting the flanks 60, 62.

The first flank 60 and the second flank 62 preferably extend in planes perpendicular to the axis A-A' of the spiral created by the insert 28. They each have a thickness substantially equal to the thickness e2.

The curved segment 64 has a bending radius preferably greater than 0.5 times the thickness e2 of the second tape 56, and advantageously comprised between 0.5 and 1 time the thickness e2. This limits the risks of cracking of the second tape 56.

The height h of the rod 50, considered perpendicular to the axis A-A' from the wings 52 to the outer free end, is preferably greater than three times the thickness e1 of the first tape 31.

As indicated above, the rod 50 is inserted in the interstice 40, defining an axial play in the interstice 40.

When the rod 50 is situated at the average pitch of the interstice 40, the average half-play j2 is greater than or equal to one quarter of the total play of the carcass 26. This prevents risks of overlap between the different turns of the insert 28.

The rod 50 is thus free to slide axially in the interstice 40 between the intermediate part 34 of one turn of the carcass 26 and the inner part 32 of the adjacent turn of the carcass 26.

Each wing 52 extends substantially over a cylindrical enclosure with axis A-A'. It protrudes from the rod 50.

Each wing 52 is positioned outside the interstice 40. It presses at least partially on the inner surface 39 of the inner part 32 of a turn of the carcass 26.

The wing 52 has a free edge, preferably rounded.

The width of each wing 52, considered axially along the axis A-A', is sufficient to allow contact on the inner surface 39 of the inner part 32 of a turn of the carcass 26.

This width is also chosen to delimit an axial play j3, defined between the wings 52 across from two successive turns of the insert 28, advantageously greater than the axial play of the carcass 26.

Thus, overlaps between different turns of the insert 28 are avoided, each wing 52 of a turn remaining continuously axially separated from the wing 52 of an adjacent turn.

The wings 52 are capable of sliding freely along the axis A-A' on the inner surfaces 59 of the inner parts 32.

Typically, the width of each wing 52 is comprised between 5 mm and 25 mm, the total width of each turn of the insert 18 advantageously being comprised between 10 mm and 50 mm, in particular between 20 mm and 30 mm.

Each connecting segment 54 connects a flank 60, 62 to a wing 52. The bending radius of the connecting segment 54 is greater than 0.5 times the thickness e2 of the second tape 56, and is in particular comprised between 0.5 times and 1 time the thickness e2.

In reference to FIG. 1, the pressure vault 27 is designed to react the forces related to the pressure prevailing inside the pressure sheath 20. It is for example formed by a metal profiled wire wound in a spiral around the sheath 20. The profiled wire generally has a complex geometry, in particular in the shape of a Z, T, U, K, X or I.

The pressure vault 27 is wound in a spiral with a short pitch around the pressure sheath 20, i.e., with a spiral angle with an absolute value close to 90°, typically comprised between 75° and 90°.

The flexible pipe 10 according to the invention comprises at least one layer of armors 24, 25 formed by a helical winding of at least one elongated armor element 63.

In the example shown in FIG. 1, the flexible pipe 10 includes a plurality of inner armor layers 24, 25, in particular an inner layer of armors 24, pressed on the pressure vault 27, and an outer layer of armors 25 around which the outer sheath 30 is positioned.

Each layer of armors 24, 25 includes longitudinal armor elements 63 wound with a long pitch around the axis A-A' of the pipe.

"Wound with a long pitch" means that the absolute value of the spiral angle is less than 60°, and typically comprised between 25° and 55°.

The armor elements 63 of a first layer 24 are generally wound by an opposite angle relative to the armor elements 63 of a second layer 25. Thus, if the winding angle of the armor elements 63 of the first layer 24 is equal to +α, abeing comprised between 25° and 55°, the winding angle of the armor elements 63 of the second layer of armors 25 positioned in contact with the first layer of armors 24 is for example equal to −α.

The armor elements 63 are for example formed by metal wires, in particular steel wires, or strips of composite material, for example reinforced carbon fiber strips.

The outer sheath 30 is designed to prevent the permeation of fluid from the outside of the flexible pipe 10 toward the inside. It is advantageously made from a polymer material, in particular with a base of a polyolefin, such as polyethylene, or a base of a polyamide, such as PA11 or PA12.

The thickness of the outer sheath 30 is for example comprised between 5 mm and 15 mm.

Figure 4:
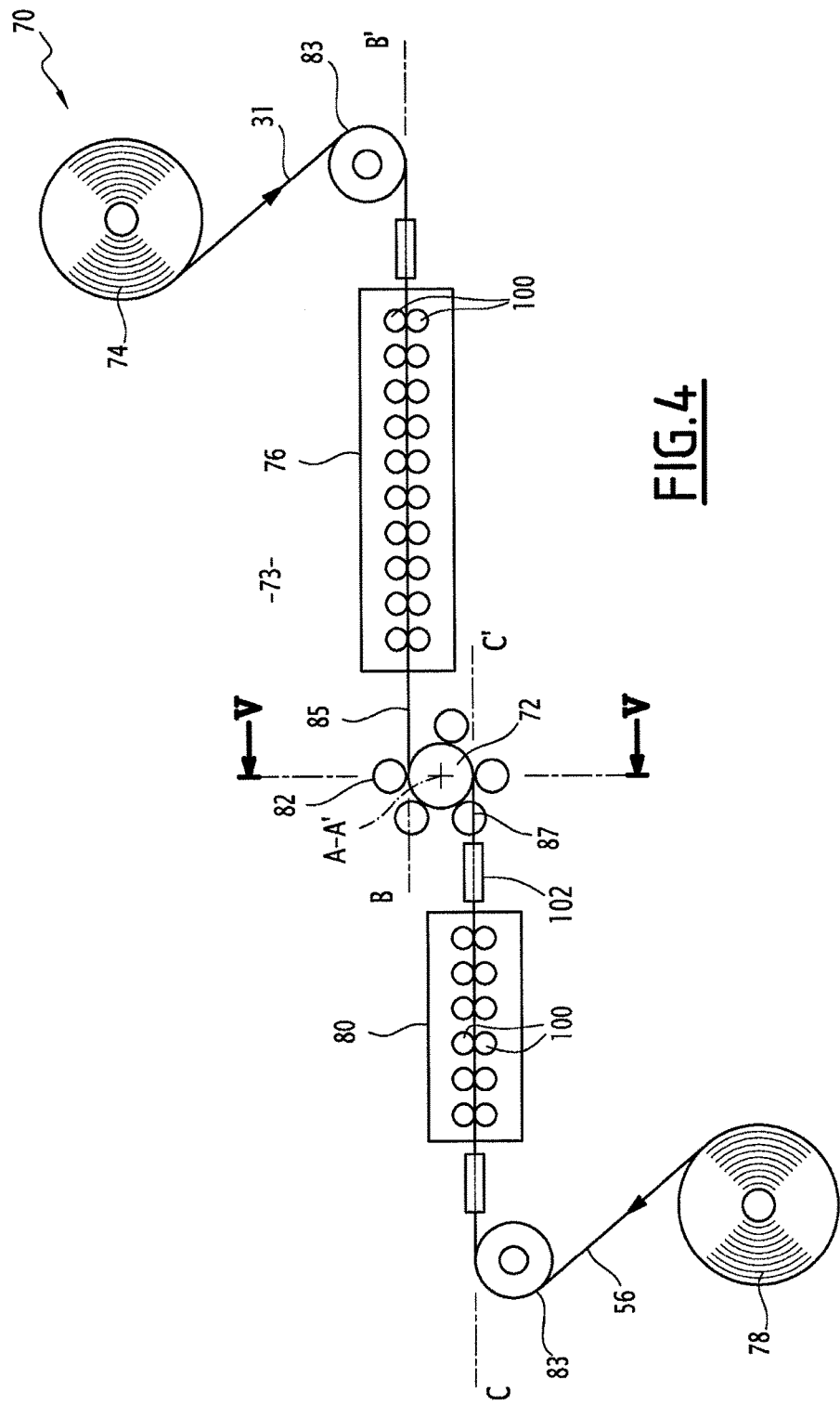
FIG. 4 is a diagrammatic perspective end view of a manufacturing and placement unit for the carcass and the insert.

The carcass 26 and the insert 28 are manufactured and placed simultaneously in a manufacturing and placement unit 70, diagrammatically illustrated by FIGS. 4 and 5.

As illustrated by these figures, the unit 70 includes a mandrel 72 rotating around an axis A-A', intended to guide the winding of the carcass 26 and the insert 28.

The unit 70 includes a support 73 rotating around the axis A-A' and relative to the mandrel 72, a first unwinder 74 (shown diagrammatically) receiving the first tape 31, and a carcass profiler 76 positioned downstream from the first unwinder 74 between the first unwinder 74 and the mandrel 72.

The unit 70 further includes a second unwinder 78 (shown diagrammatically) receiving the second tape 56, an insert profiler 80 positioned downstream from the second unwinder 78 between the second unwinder 78 and the mandrel 72.

The unit 70 further includes members 82 for radial pressing of the carcass 26 and the insert 28 against the mandrel 72, and advantageously, return means 83 to guide the first tape 31 and the second tape 56 from each unwinder 74, 78 toward a respective profiler 76, 80.

The rotating mandrel 72 protrudes axially relative to the support 73 along a winding axis A-A'.

In reference to FIG. 5, the mandrel 72 includes a bearing body 84, on which a first carcass profile 85, obtained from the first tape 31 deformed in the carcass profiler 76, and a second insert profile 87, obtained from the second tape 56 deformed in the insert profiler 80, are applied.

In this example, the rotating mandrel 72 further includes an assembly 86 for lubricating the outer surface 88 of the body 84.

The bearing body 84 for example has a surface coating appropriate for decreasing its friction coefficient. The friction coefficient of the outer surface 88 relative to the insert 28 is for example less than 0.1 in the presence of lubrication.

The bearing body 84 defines, on its outer surface 88, an upstream stop 90 for positioning the insert profile 87.

It has a substantially cylindrical upstream region 92 for assembling the insert 28 and the carcass 26 from profiles 85, 87 and a frustoconical downstream region 94 for freeing the insert 28 and the carcass 26.

The lubrication assembly 86 includes a central channel 96 for injecting lubricant arranged in the bearing body 84. The channel 96 emerges through transverse openings 98 in the upstream region 92.

The rotating mandrel 72 is able to be rotated around the axis A-A' with a speed and a rotation direction different from those of the support 73.

Advantageously, the mandrel 72 is rotated in a direction opposite that of the support 73, and with a speed 10% lower than that of the support 73.

This allows a rapid release of the formed insert 28 by pressing on the surface 88, and avoids the problems of gripping or jamming of the carcass 26 on the mandrel 72.

The rotation of the rotating mandrel 72 tends to locally increase the inner diameter of the carcass 26 to favor its discharge.

The support 73 for example includes a plate rotated around the axis A-A' in the flow direction of the insert 28 and the carcass 26.

It bears the unwinders 74, 78 and the profilers 76, 80. In this example, the profilers 76, 80 are positioned diametrically opposite one another, on either side of a median axial plane passing through the axis A-A', in order to allow the winding of the second profile 87 forming the insert 28 below the winding of the first profile 85 forming the carcass 26.

Each profiler 76, 80 includes a plurality of pairs of rollers 100 for deforming the tape 31, 56, which define a respective tangential axis B-B', C-C' respectively supplying the carcass 26 and the insert 28 on the mandrel 72.

The profilers 76, 80 are translatable on the support 73 in a plane perpendicular to the winding axis A-A'. The insert profiler 80 is able to be pivoted around its axis C-C' to adjust the insertion angle of the insert 28 into the interstice 40.

The insert profiler 80 is able to operate as a "driven wire", in order to push the second profile 87 forming the insert 28 onto the outer surface 88 of the bearing body 84.

It includes a guide member 102 that guides the second profile 87 as close as possible to the placement point to avoid its buckling and bring the profile 87 enough to ensure bracing of the insert 28 on the inside of the carcass 26.

The radial pressing members 82 are positioned radially around the surface 88. They for example include wheels able to press radially on the outside of the insert 28 and the carcass 26 to finalize the positioning of the insert 28 in the helical interstice 40, and the interlocking of the carcass 26, as shown in FIG. 5.

In one alternative, to facilitate the release of the insert 28 and the carcass 26 away from the mandrel 72, the radial pressing means 82 situated on the mandrel 72 are able to close the carcass 26 only partially. A specific mandrel (not shown), associated with additional pressing members, is then provided downstream from the mandrel 72.

A method for manufacturing the flexible pipe 10 will now be described. Initially, the tapes 31, 56 are loaded on the unwinders 74, 78.

Then, the tapes 31, 56 are unwound to be inserted respectively into the profilers 76, 80. At the same time, the support 73 is rotated around the axis A-A'.

In the carcass profiler 76, the first tape 31 deforms successively to produce the first profile 85 including the inner part 32, the intermediate part 34 and the outer part 36, without completely closing the inner part 32 and the outer part 36, as illustrated by FIG. 5.

Figure 6:
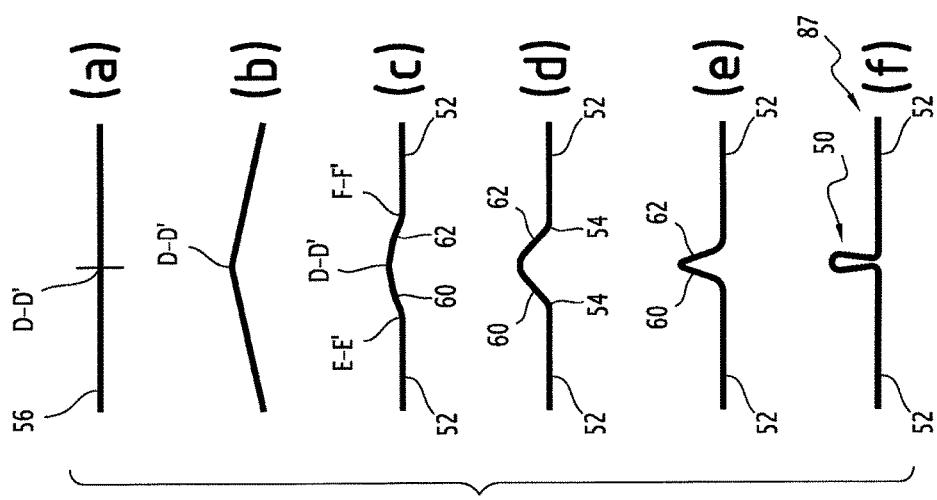
FIG. 6 is a view illustrating the operations carried out by the insert profiler to shape the insert.

In the insert profiler 80, as illustrated by FIG. 6, the second tape 56 is first deformed and bent by the rollers of the profiler 80 along a central axis D-D' (steps (a) and (b) in FIG. 6). It is next deformed and bent along the intermediate axes E-E', F-F' situated on either side of the central axis D-D' to form the wings 52, the bent segments 54 and the flanks 60, 62 (steps (c) and (d) in FIG. 6). The deformation continues by pressing the flanks 60, 62 against one another (steps (e) and (f) in FIG. 6).

A second T-shaped profile 87 comprising a rod 50 and wings 52 is then obtained, to form the insert 28.

This second profile 87 is supplied as a "driven wire" through the guide member 102, while being oriented radially relative to the axis A-A' of the mandrel 72.

It presses itself on the outer surface 88 of the body 84 and winds in a spiral, at the pitch desired for the insertion in the interstice 40, thus forming the insert 28.

At the same time, the first profile 85 resulting from the deformation of the first tape 31 winds around the second profile 87 while inserting the partially open outer part 36 of each turn into the inner part 32 of an adjacent turn, the rod 50 of the insert 28 being inserted between the intermediate part 34 of the turn and the inner part 32 of the adjacent turn.

The radial pressing members 82 are then pressed on the outside of the carcass 26 and the insert 28 to close and staple the carcass 26, while ensuring inner bracing of the insert 28 in the helical interstice 40.

The turns thus formed of the carcass 26 and the insert 28 are gradually released in the downstream direction, detaching from the mandrel 72 under the effect of the lubrication provided by the lubricating assembly 86, the frustoconical shape of the downstream part 94 of the body 84, and the rotation differential between the support 73 and the mandrel 72 tending to inflate the carcass 26.

Once the carcass 26 is produced, and the insert 28 is positioned in the carcass, the inner sheath 20 is formed around the carcass 26, for example by extrusion. The pressure vault 27 and the armor layers 24, 25 are then wound around the inner sheath 20.

The outer armor layer 30 is next advantageously made by extrusion, while being positioned outside the armor layers 24, 25.

In one alternative, at least one fluid passage duct 120 connecting the interstice 40 to the circulation passage 16 is arranged in the insert 28.

Figure 7:
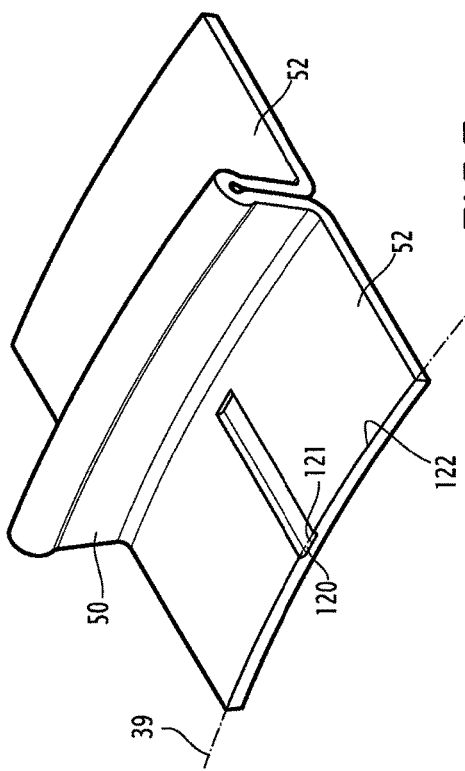
FIGS. 7, 8 and 9 illustrate alternative inserts positioned in pipes according to the invention.
Figure 8:
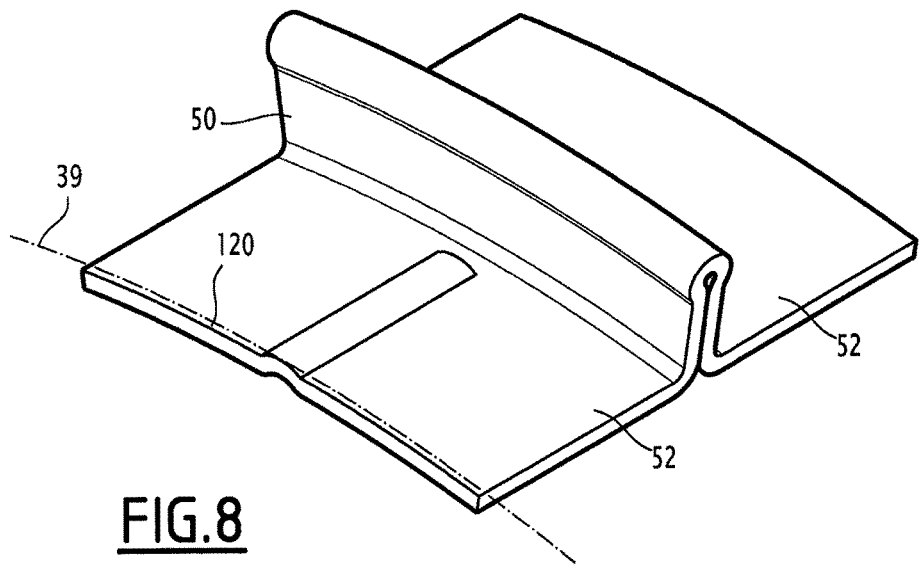
Figure 9:
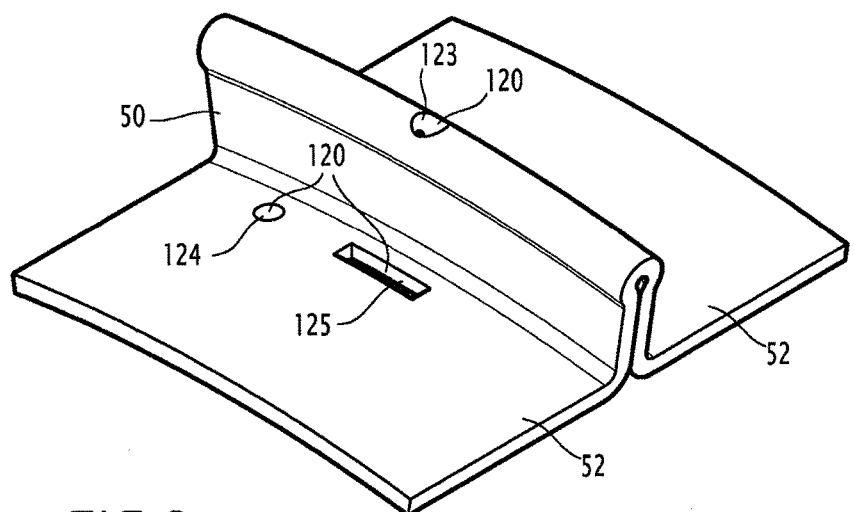

In the example shown in FIGS. 7, 8 and 9, at least one duct 120 is formed axially in each wing 52. The duct 120 extends from the free edge of the wing 52 toward the rod 50.

The first end of this duct 120, situated on the side of the free edge of the wing 52, emerges directly in the passage 16 of the pipe 10.

The other end of this duct 120 is situated near the rod 50 such that it emerges directly in a helical interstice 40 of the carcass 26. The duct 120 therefore allows the circulation of fluids between the interstice 40 on the one hand and the circulation passage 16 on the other hand.

Thus, owing to the duct 120, the inner assembly formed by the carcass 26 and the insert 28 is permeable to the passage of fluid from the inside of the carcass 26 toward the circulation passage 16 of the pipe 10. This characteristic makes it possible to avoid damaging the insert 28 when the pipe 10 transports a highly pressurized fluid, in particular a gas, and must be depressurized or pressurized quickly.

Indeed, a significant pressure difference between the inner and outer faces of the insert 28 could irreversibly damage the insert 28. It is therefore advantageous to balance the pressures on either side of the insert 28 by facilitating the flow of fluids between the interstice 40 and the circulation passage 16. The duct 120 reduces the pressure losses of this flow, which limits the pressure difference between the inner and outer faces of the insert 28, even when the pipe is depressurized or pressurized quickly.

In the example shown in FIG. 7, the duct 120 is defined by an axial cavity 121 arranged in the outer surface 122 of the wing 52 positioned bearing on the inner surface 39. The depth of the cavity 121 is advantageously comprised between 10% and 30% of the thickness e2 of the wing 52.

The width of the cavity 121, measured perpendicular to the longitudinal axis of the channel 120, is advantageously comprised between one time and three times the thickness e2 of the wing 52.

In order to facilitate the flow of the fluids on either side of the insert 28 over the entire length of the pipe 10, it is advantageous to position a large number of cavities 121 along the entire insert 28. Advantageously, the insert includes at least one cavity 121 per linear meter of insert 28, preferably at least one cavity 121 per linear decimeter of insert 28. For very harsh applications for transporting highly pressurized gas, the insert 28 can include up to one cavity 121 per linear centimeter of insert 28.

These cavities 121 are advantageously made at the same time as the insert 28 by the manufacturing unit 70. To that end, the insert profiler 80 is equipped with a plurality of pairs of rollers 100, at least one of which, advantageously that situated furthest downstream, comprises a roller provided with raised bumps designed to locally crush the second tape 56 to generate the cavities 121. The distance separating two adjacent cavities 121 along the insert 28 depends on the diameter of this roller, as well as the number and angular position of the bumps with which it is provided.

In the alternative shown in FIG. 8, the duct 120 is defined by a relief in the form of a wave positioned bearing on the inner surface 39, to at least partially separate the outer surface 122 from the inner surface 39.

Thus, the inner assembly formed by the carcass 26 and the insert 28 is permeable to the passage of fluid from the inside of the carcass 26 toward the outside of the carcass 26.

In the alternative shown in FIG. 9, the duct 120 is formed by a hole 123, 124, 125 crossing all the way through the second tape 56. According to a first alternative, the hole 124, 125 crosses through the wing 52 in the vicinity of the rod 50, so as to emerge directly in the interstice 40. In a second alternative, the hole 123 crosses through the curved outer segment 64 of the rod 50, the flow extending between the first flank 60 and the second flank 62.

In one alternative (not shown), each wing 52 is formed by a pair of flanks bent one on the other by means of a curved region at the free edge.

The flanks 60, 62 of the rod are then separated at their free end. Each flank 60, 62 protrudes from a respective flank of a wing 52.

What is claimed is:

1. A method for producing a flexible pipe, comprising:
   forming an inner carcass, the inner carcass comprising a first bent tape defining a helical interstice emerging toward a first central axis;
   producing an inner polymer sheath defining a fluid circulation path with the first central axis, the inner carcass being positioned in the inner sheath;
   arranging at least one layer of outer armors outside the inner sheath;
   placing a helical insert with a T-shaped cross-section in the helical interstice, the helical insert comprising a rod, inserted in the helical interstice, and two wings protruding on either side of the rod to inwardly close off the helical interstice,
   wherein the helical insert is formed by bending a second tape; and
     bending a first flank against a second flank, the first flank and the second flank defining between them an intermediate space to form at least one of the rod and at least one wing of the two wings.

2. The method according to claim 1, further including passing the second tape in an insert profiler to form an insert profile with a T-shaped cross-section, winding the insert profile around a mandrel, and passing the first tape in a carcass profiler to form a carcass profile and winding the carcass profile around the insert profile on the mandrel.

3. The method according to claim 2, wherein the insert profiler and the carcass profiler are positioned on either side of the mandrel, the insert profile being brought onto the mandrel opposite the carcass profile.

4. The method according to claim 2, further including closing the carcass profile after its winding around the insert profile.

5. The method according to claim 2, wherein passing the second tape in the insert profiler includes bending the second tape along a second central axis to form the rod and bending the second tape along two intermediate axes, parallel to the second central axis, to form the wings.

6. The method according to claim 2, wherein the insert profile is wound around the mandrel after the passage of the second tape in the insert profiler.

7. A flexible pipe for conveying a fluid, the flexible pipe comprising:
   an inner polymer sheath defining a fluid circulation path with a central axis;
   at least one layer of armors, arranged outside the inner sheath;
   an inner carcass, positioned in the inner sheath, the inner carcass comprising a first bent tape defining a helical interstice emerging toward the central axis; and
   a helical insert with a T-shaped cross-section comprising a rod, inserted in the helical interstice, and two wings protruding on either side of the rod to inwardly close off the helical interstice;
   wherein the helical insert is formed of a second bent tape
   wherein at least one wing of the two wings comprises a first flank and a second flank bent against the first flank, the first flank and the second flank defining between them an intermediate space.

8. The pipe according to claim 7, wherein the rod includes the first flank and the second flank bent against the first flank.

9. The pipe according to claim 7, wherein the rod has a height, measured perpendicularly to the central axis, which is greater than three times the thickness of the first tape.

10. The pipe according to claim 7, wherein the inner carcass has a first axial play, the helical insert having non-joined turns delimiting a second axial play between them greater than the first axial play.

11. The pipe according to claim 7, wherein the inner carcass has a first axial play, the rod having a half-axial play at the average pitch in the helical interstice greater than 0.25 times the first axial play.

12. The pipe according to claim 7, wherein the insert defines at least one fluid passage pipe connecting the interstice to the fluid circulation path.

13. The pipe according to claim 7, wherein the first bent tape comprises successive turns interlocked to one another, and the first bent tape has a constant thickness.

14. A flexible pipe for conveying a fluid, comprising:
   an inner polymer sheath defining a fluid circulation path with a central axis;
   at least one layer of armors, arranged outside the inner sheath;
   an inner carcass, positioned in the inner sheath, the inner carcass comprising a first bent tape defining a helical interstice emerging toward the central axis; and
   a helical insert with a T-shaped cross-section comprising a rod, inserted in the helical interstice, and two wings protruding on either side of the rod to inwardly close off the helical interstice;
   wherein the helical insert is formed of a second bent tape, and the rod includes a first flank and a second flank bent against the first flank, the first flank and the second flank defining between them an intermediate space.

15. The pipe according to claim 14, wherein the rod includes a curved outer segment at the outer free end of the rod, the curved outer segment connecting the first flank to the second flank.

16. The pipe according to claim 14, wherein a bending radius of the curved outer segment is greater than 0.5 times the thickness of the second tape, the bending radius of the curved outer segment being measured from a center point around which the curved outer segment is bent.

17. The pipe according to claim 14, wherein a first wing of the two wings protrudes from an inner end of the first flank and a second wing of the two wings protrudes from an inner end of the second flank, the helical insert including a first curved connecting segment connecting the first flank to the first wing and a second curved connecting segment connecting the second flank to the second wing.

18. The pipe according to claim 14, wherein the bending radius of the curved outer segment is comprised between 0.5 times and 1 time the thickness of the second tape.

19. The pipe according to claim 14, wherein each connecting segment has a bending radius greater than 0.5 times the thickness of the second tape, the bending radius of each connecting segment being measured from a center part around which each connecting segment is bent.

20. The pipe according to claim 14, wherein the rod has a height, measured perpendicularly to the central axis, which is greater than three times the thickness of the first tape.

21. The pipe according to claim 14, wherein the inner carcass has a first axial play, the helical insert having non joined turns delimiting a second axial play between them greater than the first axial play.

22. The pipe according to claim 14, wherein the inner carcass has a first axial play, the rod having a half-axial play at the average pitch in the helical interstice greater than 0.25 times the first axial play.

23. The pipe according to claim 14, wherein the insert defines at least one fluid passage pipe connecting the interstice to the fluid circulation path.

\* \* \* \* \*